United States Patent
Montagner

(10) Patent No.: US 11,503,839 B2
(45) Date of Patent: Nov. 22, 2022

(54) PREPARATION PROCESS OF GREEN TEA FROM YERBA MATE AND THE RESPECTIVE RESULTING PRODUCT

(71) Applicant: JULIANA MONTAGNER—ME, Ilopolis (BR)

(72) Inventor: Juliana Montagner, Ilopolis (BR)

(73) Assignee: JULIANA MONTAGNER—ME, Ilopolis (BR)

( * ) Notice: Subject to any disclaimer, the term of this patent is extended or adjusted under 35 U.S.C. 154(b) by 0 days.

(21) Appl. No.: 16/616,112

(22) PCT Filed: May 26, 2017

(86) PCT No.: PCT/BR2017/000054
§ 371 (c)(1),
(2) Date: Nov. 22, 2019

(87) PCT Pub. No.: WO2018/213900
PCT Pub. Date: Nov. 29, 2018

(65) Prior Publication Data
US 2020/0205436 A1    Jul. 2, 2020

(30) Foreign Application Priority Data
May 24, 2017    (BR) .......................... 1020170108473

(51) Int. Cl.
| A23F 3/34 | (2006.01) |
| A23F 3/16 | (2006.01) |
| A23F 3/14 | (2006.01) |
| A23F 3/18 | (2006.01) |

(52) U.S. Cl.
CPC ................ *A23F 3/34* (2013.01); *A23F 3/163* (2013.01); *A23F 3/14* (2013.01); *A23F 3/18* (2013.01); *A23V 2002/00* (2013.01); *A23V 2250/214* (2013.01); *A23V 2300/10* (2013.01)

(58) Field of Classification Search
CPC .... A23F 3/163; A23F 3/14; A23F 3/34; A23F 3/18; A23F 3/08; A23F 3/06; A23F 3/12; A23F 3/16; A23V 2002/00; A23V 2250/224; A23V 2300/10
USPC ....................................................... 426/597
See application file for complete search history.

(56) References Cited

U.S. PATENT DOCUMENTS

| 2,115,411 | A | * | 4/1938 | Cortez | ...................... | A23F 3/34 |
| | | | | | | 426/597 |
| 6,416,803 | B1 | * | 7/2002 | Shibata | ..................... | A23F 3/06 |
| | | | | | | 426/241 |

| 2003/0064130 | A1 | * | 4/2003 | Blair | ........................ | A23F 3/14 |
| | | | | | | 426/49 |
| 2013/0280389 | A1 | | 7/2013 | Fassler et al. | | |

FOREIGN PATENT DOCUMENTS

| CN | 103976046 A | 8/2014 |
| CN | 104430988 A | 3/2015 |
| JP | S58121753 A | 7/1983 |
| KR | 20090109679 A | 10/2009 |
| KR | 20100049323 A | 5/2010 |

OTHER PUBLICATIONS

NPL Katsuno et al. (in Food Chemistry 148: 388-395, 2014) (Year: 2014).*
NPL Tea processing (date is 2013: please see Under Leaf Maceration, Picture says 2013 Eli tea and also please consider Below CTC, CTC developed in the year 1930) (Year: 2013).*
NPL Friedman et al. (in J food Sci. vol 74(5): pp. 1-16, 2009) (Year: 2009).*
NPL Dan C et al. (CN 104430988 A) [English Translation]. (Year: 2015).*
R.L.T. Matsumoto, 2008, 103 pages, "Atividade antioxidante do chá mate (Ilex paraguariensis)," Dissertacao (Mestrado em Saude Publica)—Faculdade de Saude Publica, Universidade de Sao Paulo, Sao Paulo. itens "2.5. 1. 1 Chimarrao e Terere" e "2.5. 1.2 Cha mate tostado" (start on p. 36).
M.C. Esmelindro et al., "Caracterização Físico-Química Da Erva-Mate: Influência Das Etapas Do Processamento Industrial," Ciênc. Tecnol. Aliment., Campinas, 22(2): 193-204, maio-ago. 2002.
M.F. Nishiyama et al., "Chá verde brasileiro (Camellia sinensis var assamica): efeitos do tempo de infusão, acondicionamento da erva e forma de preparo sobre a eficiência de extrao dos bioativos e sobre a estabilidade da bebida," Ciênc. Tecnol. Aliment., Campinas, 30(Supl.1): 191-196, maio 2010.
International Search Report & Written Opinion for PCT/BR2017/000054, dated Nov. 29, 2017.

* cited by examiner

*Primary Examiner* — Donald R Spamer
*Assistant Examiner* — Bhaskar Mukhopadhyay
(74) *Attorney, Agent, or Firm* — Pilloff Passino & Cosenza LLP; Sean A. Passino; Rachel K. Pilloff

(57) ABSTRACT

The present invention abstract describes the steps of a process for the preparation of green tea and the respective end product, wherein, in the initial step of the proposed process, the young leaves (buds) of yerba mate are subjected to steam at between 90 and 100° for a certain time, the moisture is removed from the steaming step, and, after passing through the steam (steaming step) and twisting, the leaves are cooled (cooling step), rolled ($1^{st}$ rolling), dried for the first time ($1^{st}$ drying), rolled for the second time ($2^{nd}$ rolling), dried for the second time ($2^{nd}$ drying) and separated (segregation step).

1 Claim, No Drawings

PREPARATION PROCESS OF GREEN TEA FROM YERBA MATE AND THE RESPECTIVE RESULTING PRODUCT

TECHNICAL FIELD

The following invention specification relates to the process for the preparation of green tea made from yerba mate (*ilex paraguariensis*), and the respective end product.

PRIOR ART

It is known that the use of yerba mate as food is restricted to some regions of South America, where its largest consumption is in the form of mate, a cultural habit. The present product has the potential to compete for consumers worldwide, as it does the *Camellia sinensis* green tea and the black tea, and reach consumers who the mate would not be able to reach.

In order to use the yerba mate, several drying processes are known, for example, those described in PI 9504075-7 comprising a construction having a heat draft system through modular upper outlets with a butterfly valve on each chimney. Inside the oven, two belts are moved in series, in the opposite direction, being one upper belt and one lower belt, and the belts are unloaded by means of load dumpers, consisting of a bladed shaft, rotating in the same direction as the belts. A deflector plate directs the yerba mate from the upper belt to the lower belt and to a discharge outlet guiding the yerba mate from the lower belt to the outlet conveyor belt. The furnaces conduct the heat generated to the oven by means of ducts that split into two branches, where a distributor receives the yerba mate from a belt.

MU 7703102-4 describes an equipment for the industrial betterment of yerba mate, wherein it is fed by a vertical duct, and feeds a tilting horizontal chute for the action of two rows of cam-action S-shaped pestles alternating on their rollers, and motor-driven sequentials to grind and create the yerba mate gum, such equipment may be made up of a single row of pestles that, in turn, use wooden or steel beams as a guide, so that the pestles have a free action to reach the bottom of the lower chute provided at its end with a conveyor thread to take the yerba mate in its end form to usual bagging conveyors.

PI 1002236-8 describes a fractionation and scorching process for yerba mate leaves with hot water steam for eliminating toxicity. Briefly, it consists of passing the herb leaves through a water steam bath with controlled and previously calculated temperature in order to prepare the leaf for human consumption. The process is initiated by a primary equipment with saturated steam injection from a water-tube boiler, interconnected to the secondary equipment that receives, through the injectors, the injection of reheated steam at preset pressure and temperature.

An equipment for scorching and drying yerba mate leaves using hot water steam is described in MU 9001057-4, the purpose of which is to eliminate contamination of the yerba mate by PAHs (aromatic polycyclic hydrocarbons) from the scorching and drying process of the yerba mate leaves, the equipment consists of a primary processing module with herb feeding inlet and a secondary processing module with a total of twelve injecting nozzles, being six on each side, coming from the water-tube boiler by means of saturated steam piping and reheated steam piping interconnected to the secondary nozzles, being two on each side and one on the top.

DISCUSSION

Expanding a form of consumption of yerba mate means introducing into the people's diet the antioxidants contained in such species, which are superior to those of *Camellia sinensis*.

From what is known from the prior art, the direct contact of yerba mate leaves with gases generated in the furnace during the scorching stage can contaminate the raw material with aromatic polycyclic hydrocarbons. They have a high carcinogenic potential, which may remain in the end product intended for the consumer. Not washing the leaves at the beginning of processing is also a problem. The vegetal material may be contaminated by environmental pollutants, microorganisms and small invertebrates.

In the initial step of proposed process, the young leaves (buds) of yerba mate are subjected to steam between 90 and 100° for a certain time. Thus, the invention is intended to solve the abovementioned drawbacks by modifying how the leaves are processed. After passing through the steam (steaming step), the leaves are cooled (cooling step), rolled ($1^{st}$ rolling), dried for the first time ($1^{st}$ drying), rolled for the second time ($2^{nd}$ rolling), dried for the second time ($2^{nd}$ drying) and separated (segregation step).

Description

The embodiment of the invention proposed in this specification is achieved by describing the different steps required for carrying out the present application, such that it can be fully reproduced by means of appropriate technique, thus allowing full characterization of the claimed process functionality.

Based on the different steps described that express the best or preferential way to carry out the process now devised, the descriptive part of the report is based, thus clarifying aspects that may have been presumed, so as to clearly determine the protection now claimed.

These operations may vary, provided that they do not depart from the initially claimed subject matter.

In this case, the products can be generated by different operations.

In the preparation process developed, the young leaves of yerba mate should go through the following steps:

Steaming the young leaves (buds) of yerba mate at 90 to 100° C. for three to five minutes (steaming step);

Next, it is required to remove excess water contained in the leaves due to the steam bath. It can be done manually by wrapping the leaves on a cloth and the green juice is extracted when the cloth is twisted, or industrially by pressing the leaves until the green juice is removed. After this step of removing the green juice coming from steaming, the leaves are rolled for the first time for 20 minutes (first rolling). In this step, it is crucial to roll the leaves, and said method can be cited or changed;

Immediately after this step, the leaves are spread on a flat surface for cooling with the aid of the continuous cold air coming from a fan/cooler (cooling). In this step, it is crucial to cool the leaves, and said method can be cited or changed;

The next step is the first drying, or semi-drying, in which the leaves will dehydrate at 100° C. for 20 minutes (drying). In this step, it is crucial to dry the leaves, and said method can be cited or changed;

The leaves are then guided to roll for a second time for 10 to 15 minutes until proper shape/twist (second rolling) is achieved. In this step, it is crucial to roll the leaves, and said method can be cited or changed;

Next, the leaves complete the drying process, for 22 to 24 minutes at a temperature of 110 to 115° C. In this step, it is crucial to dry the leaves, and said method can be cited or changed, and;

The last step is the segregation/sorting (segregation), in which, after drying, the larger/whole leaves, broken leaves and particulate leaves must be separated.

The invention claimed is:

1. A preparation process of green tea from yerba mate, consisting of the following steps:
   steaming young leaves (buds) of yerba mate at 90 to 100° C. for three to five minutes, wherein the young leaves are buds,
   removing moisture from the young leaves resulting from the previous step by extracting the juice from the young leaves,
   thereafter first rolling the leaves for 20 minutes,
   immediately thereafter, spreading the young leaves on a flat surface for cooling aided by a continuous cold air of a fan or a cooler,
   thereafter first drying in which the young leaves dehydrate at 100° C. for 20 minutes,
   thereafter second rolling by driving the young leaves to roll a second time for 10 to 15 minutes until a desired shape or twist is attained,
   thereafter second drying the young leaves for 22 to 24 minutes at 110 to 115° C. temperature, and
   thereafter segregating/classifying, wherein after second drying whole young leaves, separating the whole young leaves, broken young leaves and particulate young leaves, wherein the green tea from yerba mate is makeable from the whole young leaves, broken young leaves and particulate young leaves.

* * * * *